(12) United States Patent
Abu Qahouq

(10) Patent No.: US 9,035,637 B1
(45) Date of Patent: May 19, 2015

(54) SYSTEMS AND METHODS FOR CONTROLLING POWER CONVERTERS

(75) Inventor: Jaber A. Abu Qahouq, Tuscaloosa, AL (US)

(73) Assignee: The Board of Trustees of the University of Alabama for and behalf of the University of Alabama, Huntsville, AL (US)

( * ) Notice: Subject to any disclaimer, the term of this patent is extended or adjusted under 35 U.S.C. 154(b) by 802 days.

(21) Appl. No.: 12/876,676

(22) Filed: Sep. 7, 2010

Related U.S. Application Data

(60) Provisional application No. 61/240,260, filed on Sep. 7, 2009.

(51) Int. Cl.
G05F 1/00 (2006.01)
H02M 3/157 (2006.01)

(52) U.S. Cl.
CPC .................................... H02M 3/157 (2013.01)

(58) Field of Classification Search
USPC ............... 363/20, 21.01, 21.04, 21.05, 21.09, 363/21.1, 21.11, 21.12, 21.17, 21.18, 22, 363/23, 25, 26, 41, 44–46; 323/222, 271, 323/282–285
See application file for complete search history.

(56) References Cited

U.S. PATENT DOCUMENTS

| | | | | |
|---|---|---|---|---|
| 3,216,676 A * | 11/1965 | Brown et al. | | 244/195 |
| 6,252,455 B1 * | 6/2001 | Kurby et al. | | 330/136 |
| 6,324,228 B1 * | 11/2001 | Millward et al. | | 375/344 |
| 6,628,106 B1 * | 9/2003 | Batarseh et al. | | 323/222 |
| 6,980,442 B2 * | 12/2005 | Lv et al. | | 363/21.1 |
| 7,622,820 B1 * | 11/2009 | Prodic et al. | | 307/31 |
| 7,652,459 B2 * | 1/2010 | Abu Qahouq et al. | | 323/283 |
| 7,692,329 B2 * | 4/2010 | Abu Qahouq et al. | | 307/14 |
| 8,077,490 B1 * | 12/2011 | Prodic et al. | | 363/65 |
| 2010/0027300 A1 * | 2/2010 | Fang | | 363/21.16 |

* cited by examiner

Primary Examiner — Nguyen Tran
(74) Attorney, Agent, or Firm — Maynard Cooper & Gale, P.C.; Jon E. Holland

(57) ABSTRACT

A power conversion system has a power converter configured to receive an input voltage signal, convert the input voltage to an output voltage signal, and provide the output voltage signal to a load and a closed loop compensator configured to receive the output voltage signal and a reference voltage signal, the closed loop compensator configured to transmit an error signal indicative of a difference between the output voltage signal and the reference voltage signal. The power conversion system further has a pulse with modulator configured to receive the error signal and modulate a control signal with the error signal to control the output voltage signal, the pulse width modulator configured to transmit the control signal to the power converter and logic configured to receive the error signal and control the closed loop compensator based upon the error signal. A controller observes the error signal characterstics such as peak-to-peak values, frequency and phase and adjust the closed loop controller variables and other power converter system variables in order to improve the dynamic performance and improve stability.

14 Claims, 10 Drawing Sheets

US 9,035,637 B1

SYSTEMS AND METHODS FOR CONTROLLING POWER CONVERTERS

CROSS REFERENCE TO RELATED APPLICATIONS

This application claims priority to U.S. Provisional Application No. 61/240,260, entitled "Systems and Methods for Controlling Power Converters," and filed on Sep. 7, 2009, which is incorporated herein by reference.

BACKGROUND

A power converter receives an input voltage and supplies an output voltage to a load (or an electrical device), and the output voltage and corresponding current resulting from the output voltage should meet certain specifications of the load. As an example, the power converter may receive a 12 Volt input voltage, and the load may require a 1.5 Volt output voltage to operate properly, which can be referred to as a target voltage.

In such an example, the power converter converts the 12 Volt input voltage to the 1.5 Volt output voltage, and supplies the 1.5 Volt output voltage to the load. In converting the input voltage to the output voltage, the power converter regulates the output current and voltage that is being supplied to the load such that 1.5 Volt is supplied to the load.

Typically, the power converter controller comprises switching logic that turns on and off, often referred to as a duty cycle, in order to regulate the output voltage and output current. The switching logic is designed to ensure that the output voltage remains within a specified range. In this regard, the output voltage may vary slightly above (overshoot) or slightly below (undershoot) the target output voltage for the load, especially under dynamic transients.

In order to ensure that the output voltage remains within a desired range of the target output voltage with minimum deviation under dynamic transients and other variations, e.g., 1.5 Volts as described in the example, power converters often have a closed-loop controller that measures the difference between the output voltage and a reference voltage. Based upon the measurement, the controller may modify the duty cycle of the switching logic in order to increase and/or decrease the duty cycle to keep the output voltage within a desired range of the target output voltage.

The controller design and related transfer function for the closed loop compensation may become very complicated and time and resources consuming. They also may require significant circuitry size that consumes a significant amount of power to perform estimation and complex calculations. They are often designed based upon approximating the power stage transfer function of the power converter. It is often difficult to obtain a design with the best performance that operates under desired constraints. In addition, the controllers are often designed based upon criteria such as gain margin and phase margin. Such criterion does not guarantee that the controller will achieve the optimum dynamic output voltage deviation and settling time (closed loop performance) after a load transient, increase or decrease, or under other operation variations such as input voltage variations. Furthermore, the power converter closed loop performance may be affected by aging, temperature variations, manufacturing process variations, and other parameters such as output and input capacitance, inductance, and switching frequency that can affect the power stage transfer function of the power converter and affect the closed loop performance and stability of the closed loop converter system. In this case, a different closed loop compensator design may be needed to maintain and get back the good closed loop performance and stability.

DETAILED DESCRIPTION

The present disclosure relates to controller systems and methods for controlling power converters. An exemplary embodiment of a control system for a power converter comprises logic that monitors an error signal provided by a closed-loop compensator. In The error signal is indicative of a difference between the output voltage of the power converter and a reference voltage. Based upon the error signal characterstics, the logic adjusts the closed-loop compensator in order to yield better dynamic response performance and keep deviations in the output voltage within a smaller range of the target voltage and/or reduce settling time.

Figure 1:
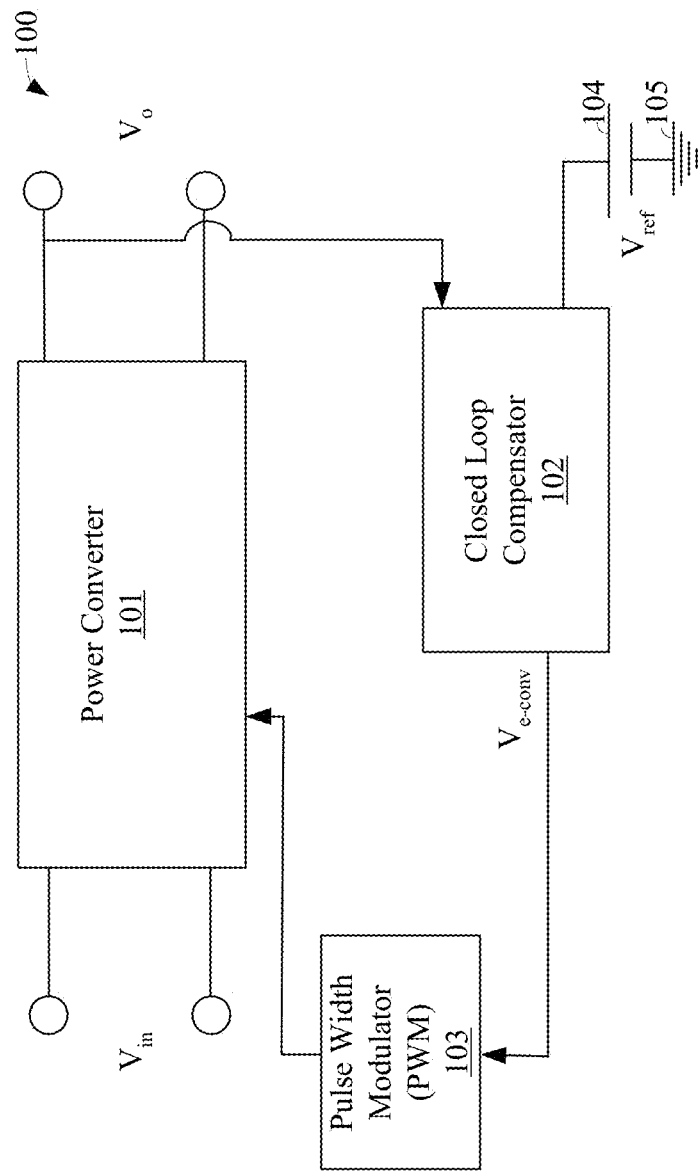
FIG. 1 is a block diagram depicting a power converter system with closed-loop control.

FIG. 1 depicts a power conversion system 100 with closed-loop control. The system 100 comprises a power converter 101, a closed-loop compensator 102, and a pulse width modulator 103.

The power converter 101 receives an input voltage $V_{in}$, converts the input voltage $V_{in}$ into an output voltage $V_o$, and provides the output voltage $V_o$ to a load (not shown). The power converter 101 may be any type of power converter known in the art or future-developed, including but not limited to a direct current (DC) to DC converter or an alternating current (AC) to DC converter.

The closed-loop compensator 102 receives at least two inputs. In this example, the closed-loop compensator 102 receives a signal indicative of the output voltage $V_o$, and the closed-loop compensator 102 receives a reference signal indicative of voltage $V_{ref}$ from a power source 104, that is tied to a reference point 105, such as ground, as shown by FIG. 1.

The closed-loop compensator 102 provides, based upon the two input signals in this example, $V_o$ and $V_{ref}$, an analog error signal $V_{e\text{-}conv}$ indicative of the difference between the output voltage and the target output voltage. Note that the closed-loop compensator 102 can be constructed of various electronic components, including amplifiers, resistors, capacitors, and the like. For example, the compensator 102 may comprise an operational amplifier that has an input connection for receiving $V_o$ and an input connection for receiving $V_{ref}$. Such operational amplifier may apply a gain (K) to the difference of $V_o$ and $V_{ref}$. The compensator 102 can be also implemented via a digital controller that provides an output based on the input signals according to a predefined equation or otherwise.

The error signal $V_{e\text{-}conv}$ is provided to the pulse width modulator (PWM) 103. The PWM 103 uses the error signal $V_{e\text{-}conv}$ to generate the switching duty cycle/ratio so that variances from the target voltage and settling of the output signal of the output voltage $V_o$ are minimized or reduced as may be desired.

Figure 2:
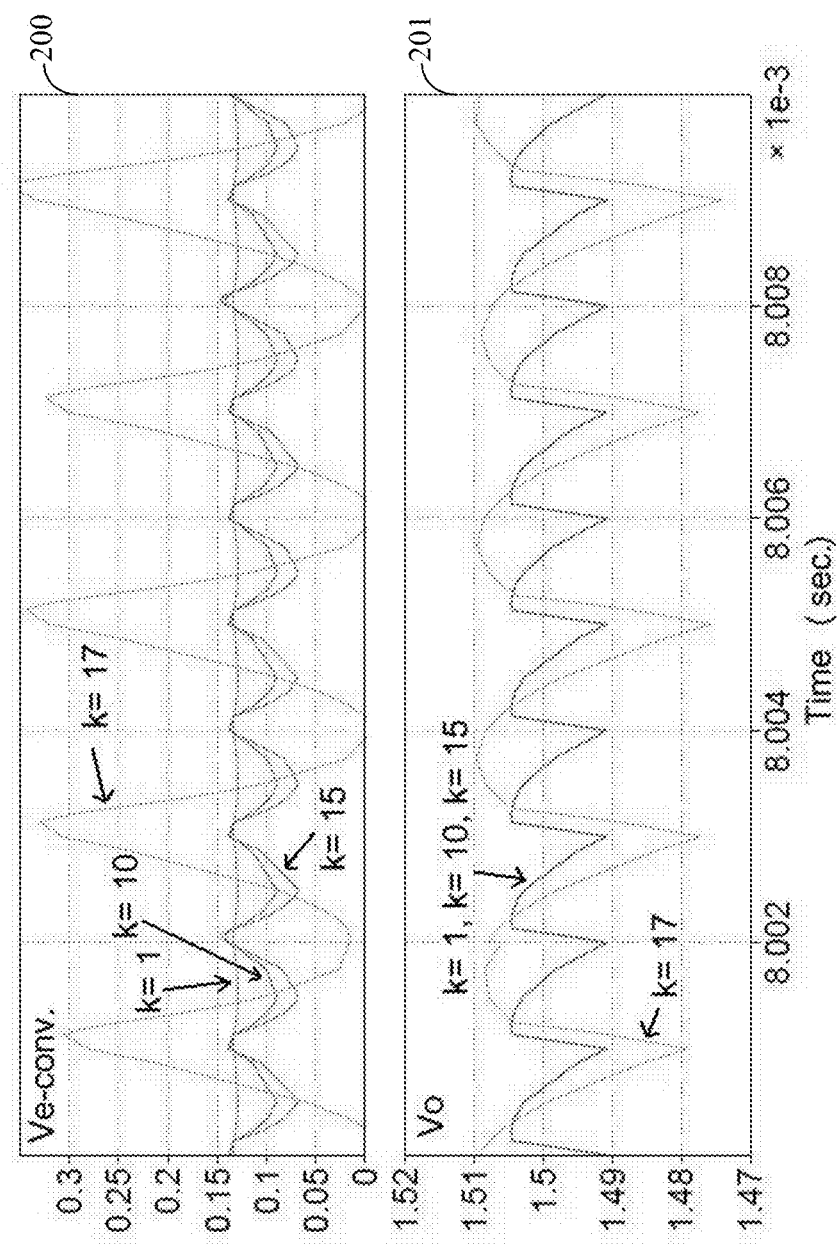
FIG. 2 is a graph depicting an exemplary behavior of the power converter system of FIG. 1 during steady state.

FIG. 2 depicts two graphs 200, 201. Graph 200 is a graphical representation of a plurality of exemplary error signals $V_{e\text{-}conv}$ for various exemplary gains (K) of the compensator 102 (FIG. 1) when the power converter 101 (FIG. 1) is experiencing a steady state operation, i.e., the load (not shown) is relatively constant. This graph of FIG. 2 is obtained from a buck-type power converter for use as an example. Other types of power converters may be used as may be desired. The graph 200 shows that the error signals vary in frequency and peak-to-peak voltage ($V_{e\text{-}pp}$) depending upon the gain that is applied. Notably, as K increases, i.e., the gain of the closed-loop compensator 102 increases, the $V_{e\text{-}pp}$ of the error signals increases. Further, as shown in graph 200, as K increases, the frequency $f_e$ of the error signals does not change and it stays equal or approximately equal to the switching frequency of the power converter until certain K values are reached, for example at K=17 in this design, the frequency $f_e$ is no longer equal to the converter's switching frequency $f_{sw}$.

Graph 201 is a graphical representation of the output voltages ($V_o$) signals for various exemplary gains (K) of the compensator 102 during the same interval in graph 200. As described hereinabove with reference to FIG. 1, $V_o$ is modulated by the PWM 103 based on the error signals. In this regard, the output voltage $V_o$ exhibits components of the error signals that tend to mitigate deviation of the output voltage $V_o$ from the target voltage, i.e., 1.5 V. In the graph 201, it can be observed that, when the frequency $f_e$ of the error signal is no longer equal to the converter's switching frequency $f_{sw}$, an unstable output voltage results and the power converter system is no longer stable. Therefore, the behavior of the change in $f_e$ can be used as an indication of the power converter becoming unstable.

Figure 3:
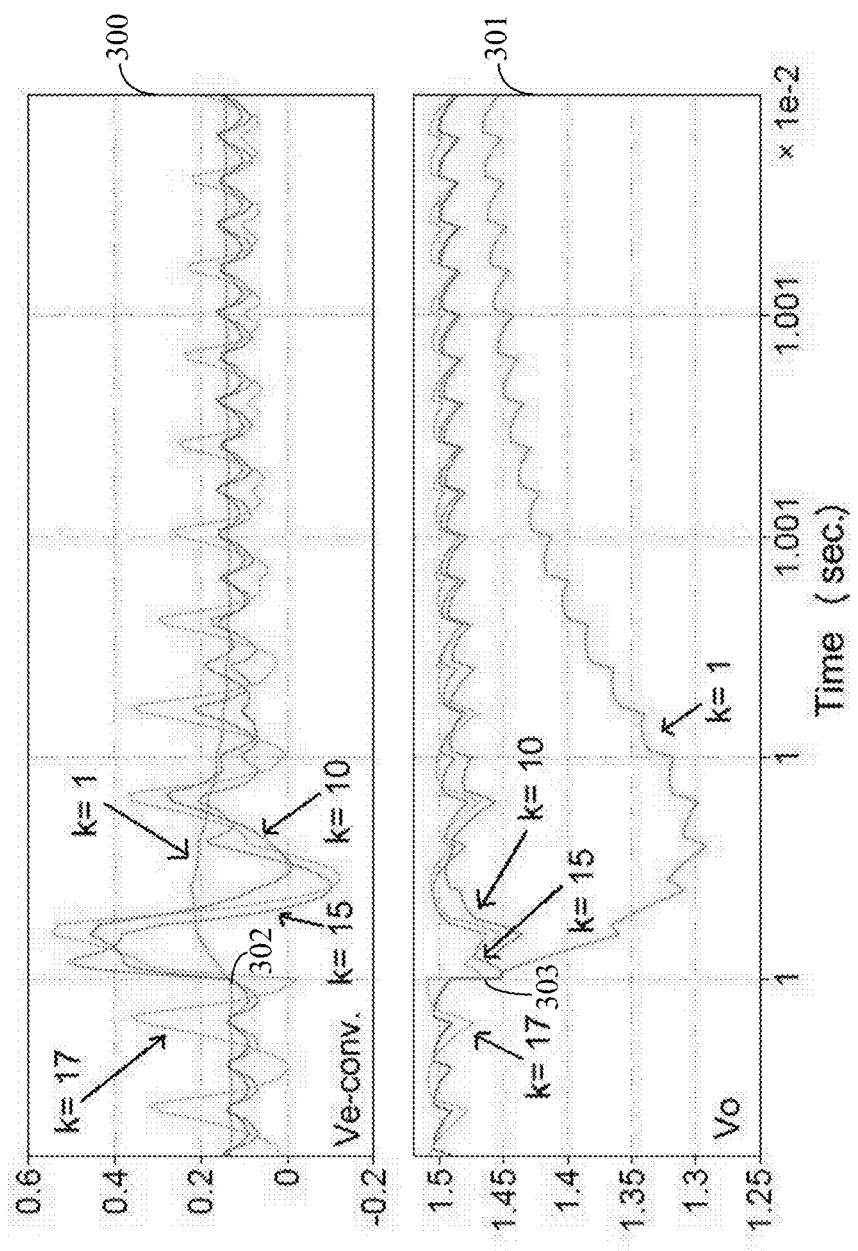
FIG. 3 is a graph depicting an exemplary behavior of the power converter system of FIG. 1 during a step-up load.

FIG. 3 depicts two graphs 300, 301. Graph 300 is a graphical representation of the $V_{e\text{-}conv}$ signals during a step-up load applied to the power converter 101. A step-up load refers to when a load (not shown) that is connected to output voltage $V_o$ requires greater current to operate. Graph 301 is a graphical representation of a plurality of $V_o$ signals produced by the power converter 101 during the time interval for graph 300. Note that K denotes the gain value that is applied by the closed-loop compensator 101 (FIG. 1).

With reference to FIG. 3, as K increases, the peak-to-peak voltage ($V_{e\text{-}pp}$) of the error signals produced at the output of the closed-loop compensator 102 increases and the output voltage deviation of the power converter and settling time decreases, as described with reference to FIG. 2. Therefore, the increase in $V_{e\text{-}pp}$ can be used to indicate smaller output voltage deviation from the target and better dynamic response of the closed loop converter system. Such increase in $V_{e\text{-}pp}$ as K is increased occurs up to a point where the the frequencies ($f_e$) of the error signal do not equal to the power converter's switching frequency ($f_{sw}$). Such point is identified in graph 300 by reference numeral 302 and in graph 301 by reference numeral 303. At this point, the power converter system 100 and the output voltage $V_o$ starts to become unstable. It is important to note with graph 301 after point 303, as $V_{e\text{-}pp}$ increases while still maintaining $f_e$ equal to $f_{sw}$ as a result of increasing K, the $V_o$ shows overshoot and undershoot that are lower, and the settling time is shorter. In this regard, those $V_o$ signals modulated with the error signals having the higher K values tend to exhibit lower overshoot and undershoot and quicker settling time.

Figure 4:
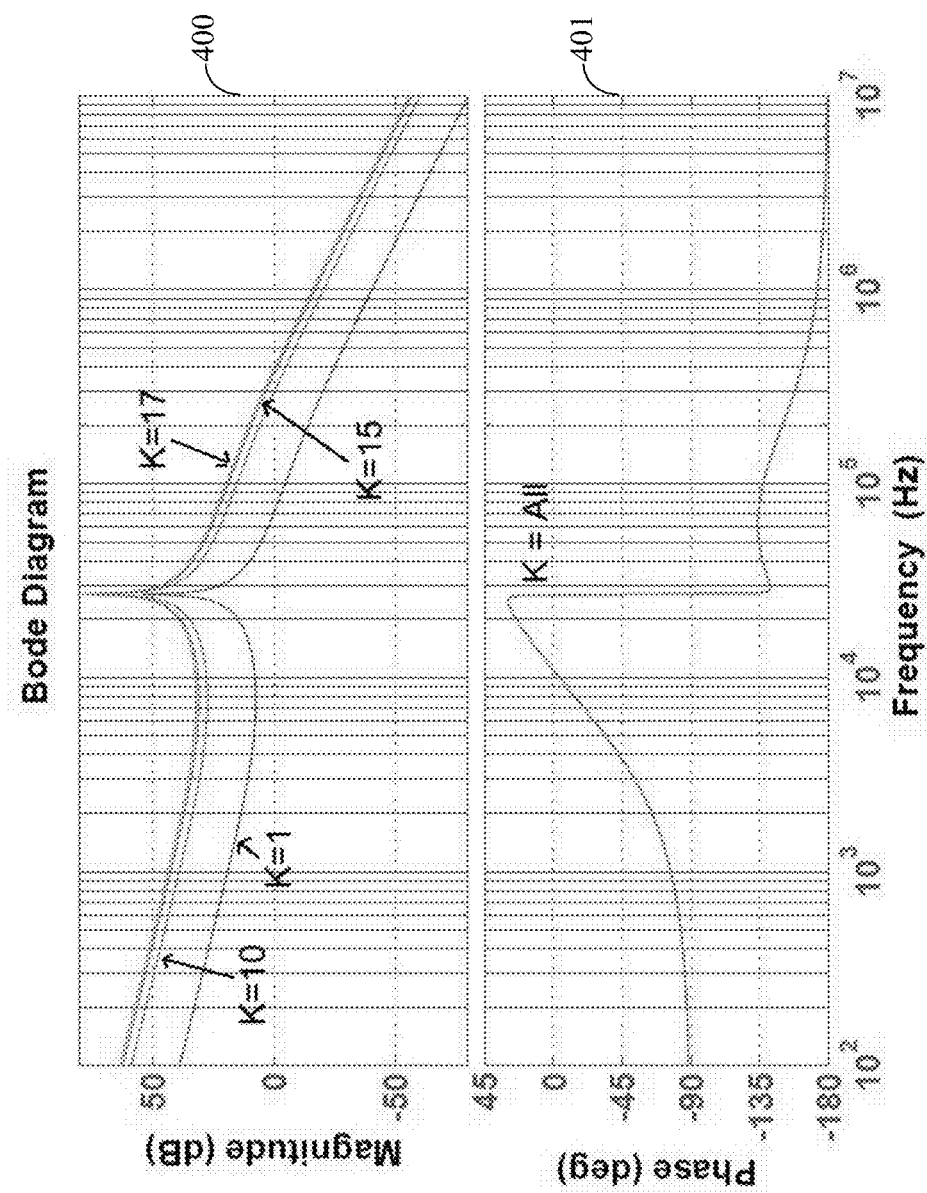
FIG. 4 is a graph depicting the magnitude in decibels (dB) and the phase of the signals of FIGS. 2 and 3.

FIG. 4 depicts bode graphs 400 and 401. Graph 400 shows that an increase in the gain K corresponds to an increase in the closed loop system bandwidth and speed which also corresponds to the reduction in output voltage deviation and settling time. Graph 401 shows that there is no change in phase.

Figure 5:
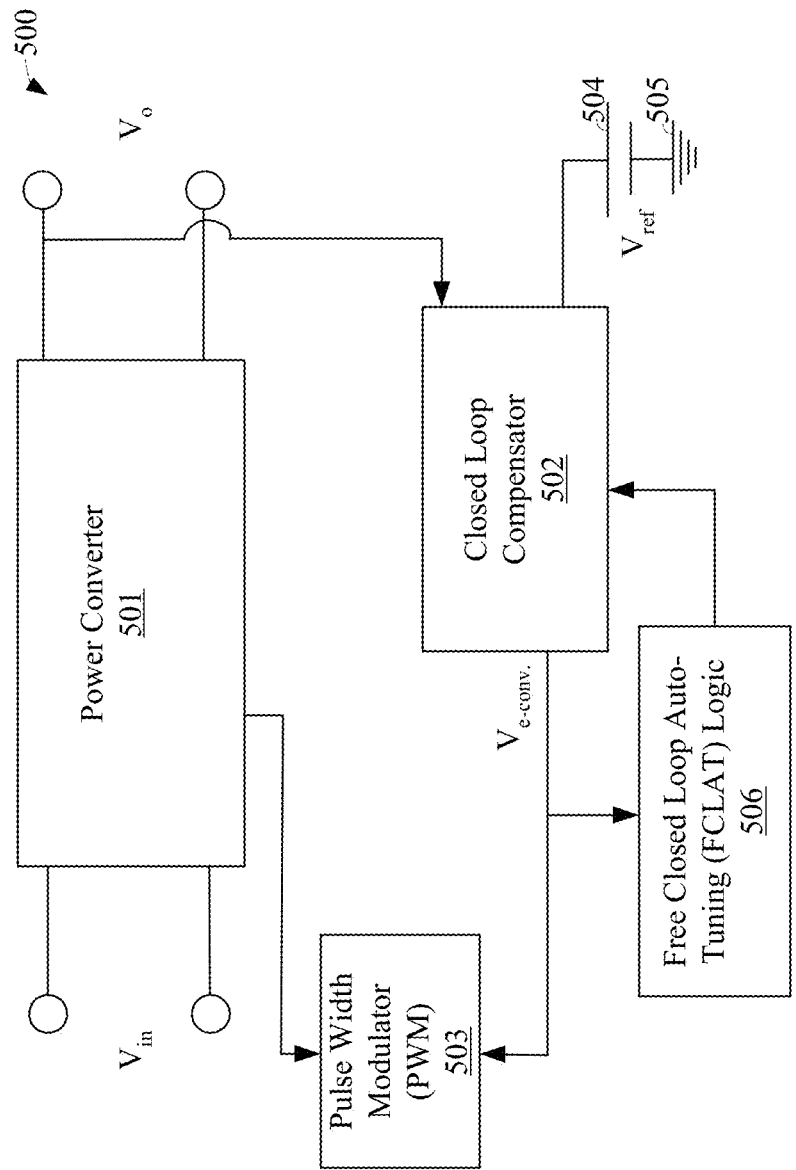
FIG. 5 is a block diagram depicting an exemplary power converter system in accordance with an embodiment of the present disclosure.

Moreover, FIG. 5 is a block diagram depicting an exemplary power conversion system 500 in accordance with an embodiment of the present disclosure. The exemplary power conversion system 500 is similar to the system 100. In this regard, the power conversion system 500 comprises a power converter 501, a closed-loop compensator 502, and a pulse width modulator 503. In addition, however, the system 500 further comprises free closed-loop auto-tuning (FCLAT) logic 506, which can be implemented in hardware, firmware, software, or any combination thereof.

In operation, the power converter 501 receives an input voltage $V_{in}$, converts the input voltage $V_{in}$ into an output voltage $V_o$, and provides the output voltage $V_o$ to a load (not shown). In addition, the closed-loop compensator 502 receives at least two inputs.

In this example, the closed-loop compensator 502 receives a signal indicative of the output voltage $V_o$, and the closed-loop compensator 502 receives a reference signal indicative of voltage $V_{ref}$ from a power source 504 that is tied to a reference point 505, such as ground, as shown by FIG. 5.

The closed-loop compensator 502 provides, based upon the two signal inputs, $V_o$ and $V_{ref}$, an error signal $V_{e\text{-}conv}$ indicative of the difference between the output voltage and the target output voltage or $V_{ref}$. Note that the closed-loop compensator 502 can be constructed of various electronic components, including amplifiers, resistors, capacitors, and the like. For example, the compensator 502 may comprise an operational amplifier that has an input connection for receiving $V_o$ and an input connection for receiving $V_{ref}$. Such an operational amplifier may apply a gain (K) to the difference of $V_o$ and $V_{ref}$. The compensator 502 can be also implemented via a digital controller that provides an output based on the input signals according to a predefined equation or otherwise.

The error signal $V_{e\text{-}conv}$ is provided to the pulse width modulator (PWM) 503. The PWM 503 uses the error signal $V_{e\text{-}conv}$ to generate the switching duty cycle/ratio of $V_o$ so that variances from the target voltage and settling are minimized within short time or reduced as may be desired.

However, in the system 500, the FCLAT logic 506 is coupled to the output of the closed-loop compensator 502 and provides feedback to the closed-loop compensator 502. In the exemplary embodiment, the feedback controls the gain (K) of the compensator 502. In this regard, the FCLAT logic 506 sets an initial gain value K of the closed-loop compensator 502. In operation, the FCLAT logic 506 receives the error signal $V_{e\text{-}conv}$ and determines the frequency $f_e$ of the error signal $V_{e\text{-}conv}$. The FCLAT logic 506 also compares the measured frequency $f_e$ with the switching frequency $f_{sw}$ of the power converter 501.

If $f_e$ is substantially equal to $f_{sw}$, such that it is within a specified range of $f_{sw}$, the FCLAT logic 506 transmits a signal to the closed-loop compensator 502 that increases the gain K of the closed-loop compensator 502. Thus, as described with reference to FIGS. 2 and 3, if the gain is increased in the error signals, variances and settling in the output voltage $V_o$ are reduced.

Thus, when $f_e$ is approximately equal to $f_{sw}$ and the FCLAT logic 506 increments the gain K of the closed-loop compensator 402, the error signal exhibiting the higher gain is transmitted to the PWM 503, which modulates the output voltage $V_o$ so that its deviation, i.e., the overshoot or undershoot from the target voltage, is lowered and the settling time for the output voltage ($V_o$) (i.e., the time for the output voltage to return to the target output voltage after the output voltage starts to deviate from the target) is reduced.

If $f_e$ and $f_{sw}$ are not substantially equal such that it is not within the specified range of $f_{sw}$, the FCLAT logic 506 transmits a signal to the closed-loop compensator 502 that decreases the gain K of the closed-loop compensator 502. As described hereinabove with reference to FIGS. 2 and 3, those error signals having a lower gain tend toward the switching frequency $f_{sw}$ of the power converter 501. This process continues throughout operation of the power conversion system 500.

Note that the FCLAT logic 506 can be run continuously or activated periodically or as parameters of the power converter 501 change over time to ensure that the power conversion system 500 performs efficiently or in a desired manner.

Figure 6:
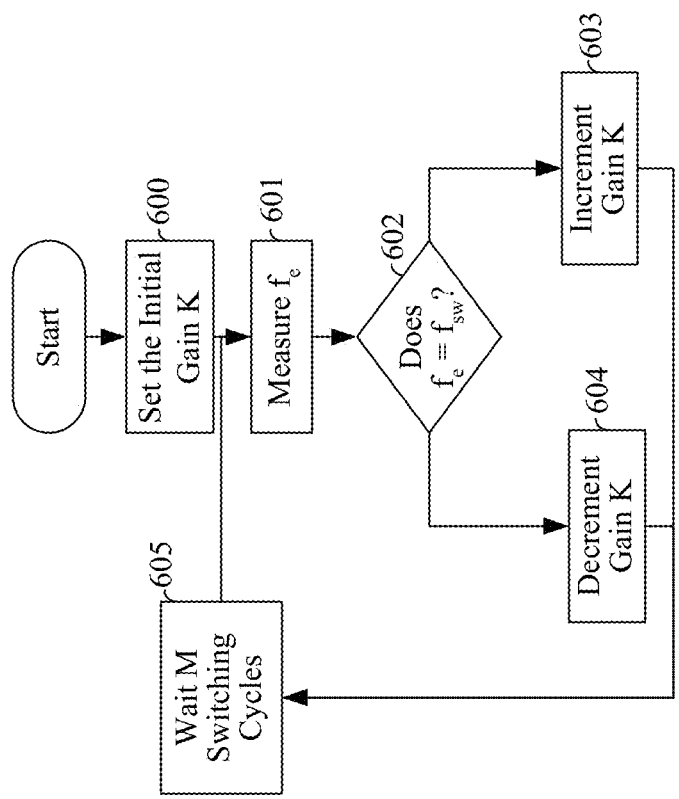
FIG. 6 is a flowchart depicting exemplary architecture and functionality of the power converter system of FIG. 5.

FIG. 6 is a flowchart depicting an exemplary operation of the FCLAT logic 506 (FIG. 5) described hereinabove. In block 600, the FCLAT logic 506 sets an initial gain K of the closed-loop compensator 502. The initial gain K may be arbitrarily chosen.

In block 601, the FCLAT logic 506 measures the frequency $f_e$ of the error signal that is output from the closed-loop compensator 502. The FCLAT logic 506 compares $f_e$ with the frequency $f_{sw}$ of the power converter 501, in block 602. If $f_e$ is equal to $f_{sw}$ within a specified range, the FCLAT logic 506 increments the gain K of the closed-loop compensator 502, as indicated in block 603. If $f_e$ is not equal to $f_{sw}$ within the specified range, the FCLAT logic 506 decrements the gain K of the closed-loop compensator 502, as indicated in step 604. The FCLAT logic 506 then waits M switching cycles before taking another measurement of the frequency $f_e$ of the error signal, as indicated in block 605. The value of M may be arbitrarily chosen.

FIGS. 7-10 further demonstrate that in addition to or rather than modifying the gain of the closed-loop compensator 502, the FCLAT 506 can also manipulate the poles and the zeros of the closed-loop compensator 502 in order to control the output voltage ($V_o$) to reduce deviations from the target voltage and quicken settling of the output signal in the event of a change in the load or any other power converter parameter such as input voltage.

Figure 7:
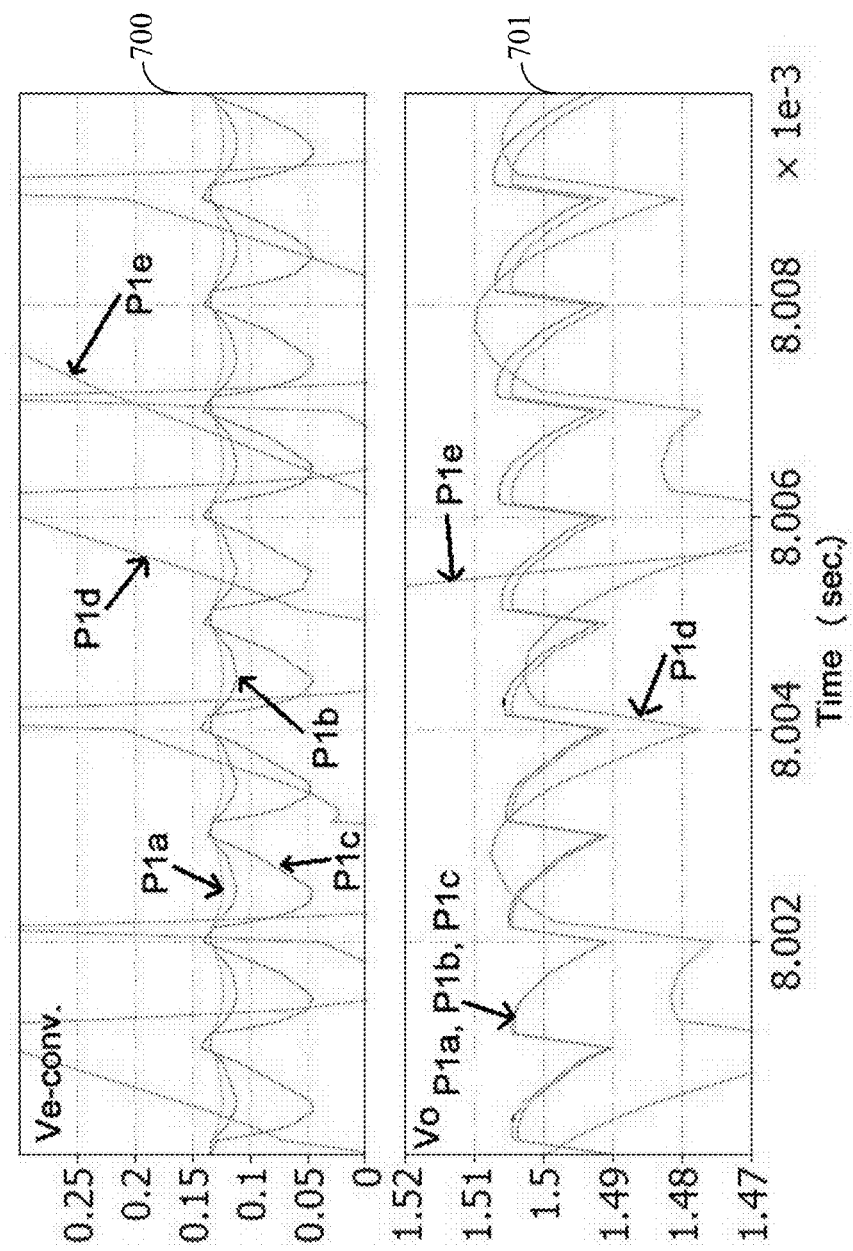
FIG. 7 is a graph depicting an exemplary behavior of the power converter system of FIG. 5 during steady state.

FIG. 7 depicts two graphs 700 and 701. Graph 700 is a graphical representation of a plurality of exemplary error signals $V_{e\text{-}conv}$ labeled P1a, P1b, P1c, P1d, and P1e ("Error signals") that are produced by the closed-loop compensator 102 (FIG. 1) when the power converter 101 (FIG. 1) is experiencing a steady state operation, i.e., the load (not shown) and other variables such as input voltage is constant. In graphs 700 and 701, P1a, P1b, P1c, P1d, and P1e denote the different pole locations as implemented by the closed-loop compensator 102 (FIG. 1) when generating the error signals. In this regard, the graph 700 shows how the error signals vary depending upon the pole locations P1a through P1e of the compensator. Notably, as the pole location is moved from P1a to P1e, the closed-loop converter system bandwidth and speed increases, and the phase also changes.

Graph 701 is a graphical representation of a plurality of output voltage ($V_o$) signals labeled P1a, P1b, P1c, P1d, and P1e ("$V_o$ signals") that are produced by the power converter 101 (FIG. 1) during the same time interval in graph 700. With reference to the graphs 700 and 701, it is important to note that as the pole locations are moved from P1a to P1c, the peak-to-peak voltage $V_{e\text{-}pp}$ of the error signals increases while still maintaining a frequency $f_e$ that is substantially or approximately equal to the frequency $f_{sw}$ of the power converter 101 in the output voltage $V_o$. The increase in the peak-to-peak voltage $V_{e\text{-}pp}$ in 700 while maintaining $f_e$ substantially or approximately equal to the frequency $f_{sw}$ of the power converter corresponds to the reduction in the output voltage deviation and the reduction in the settling time (improved closed loop performance) in 701. The case when $f_e$ that is not equal to the frequency $f_{sw}$ corresponds to the converter system becoming unstable.

Figure 8:
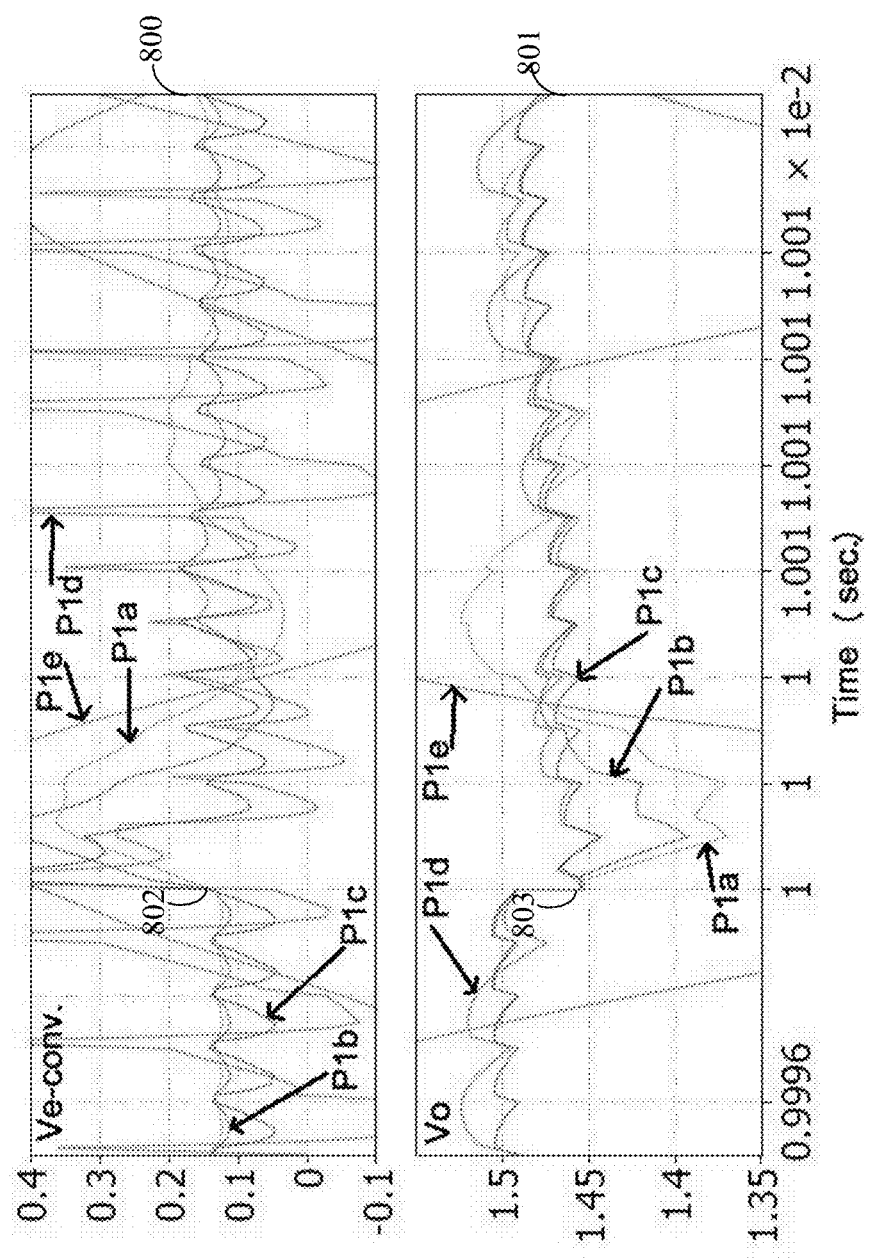
FIG. 8 is a graph depicting an exemplary behavior of the power converter system of FIG. 5 during a step-up load.

FIG. 8 depicts two graphs 800 and 801. Graph 800 is a graphical representation of a plurality of exemplary error signals for each pole P1a-P1e during a step up-load transient. Further, graph 801 is a graphical representation of a plurality of $V_o$ signals during the step up-load transient corresponding to the error signals. Notably, with reference to graph 800, as the pole location moves from P1a to P1c, the $V_{e\text{-}pp}$ of the error signals increases while still maintaining a frequency $f_e$ that is substantially equal to the switching frequency $f_{sw}$ of the power converter 101 (FIG. 1).

The step-up load transient occurs at point 802 in graph 800 and point 803 in graph 801. With reference to graph 801, as the pole location moves from P1a to P1c, the peak-to-peak voltage ($V_{e\text{-}pp}$) increases while maintaining $f_e = f_{sw}$, as described. At the same time, the output voltage $V_o$ signal deviation becomes smaller and the settling time becomes shorter when the pole location moves from P1a to P1c. Further note that as the pole location moves to P1d and P1e, the Error frequency is no longer equal to the switching frequency and the voltage deviation and settling time in graph 801 becomes large. With reference to graph 801, the system 100 behaves most efficiently when the closed-loop compensator applies a pole at location P1c. In this regard, at pole location P1c, the $V_o$ signal has minimal deviation from the target voltage and has quick settling time.

In light of the foregoing with respect to FIGS. 7 and 8, it should be noted that the pole location applied by the closed-loop compensator 102 affects the $V_o$ signal. The location chosen can minimize deviation from the target voltage and settling time.

Figure 9:
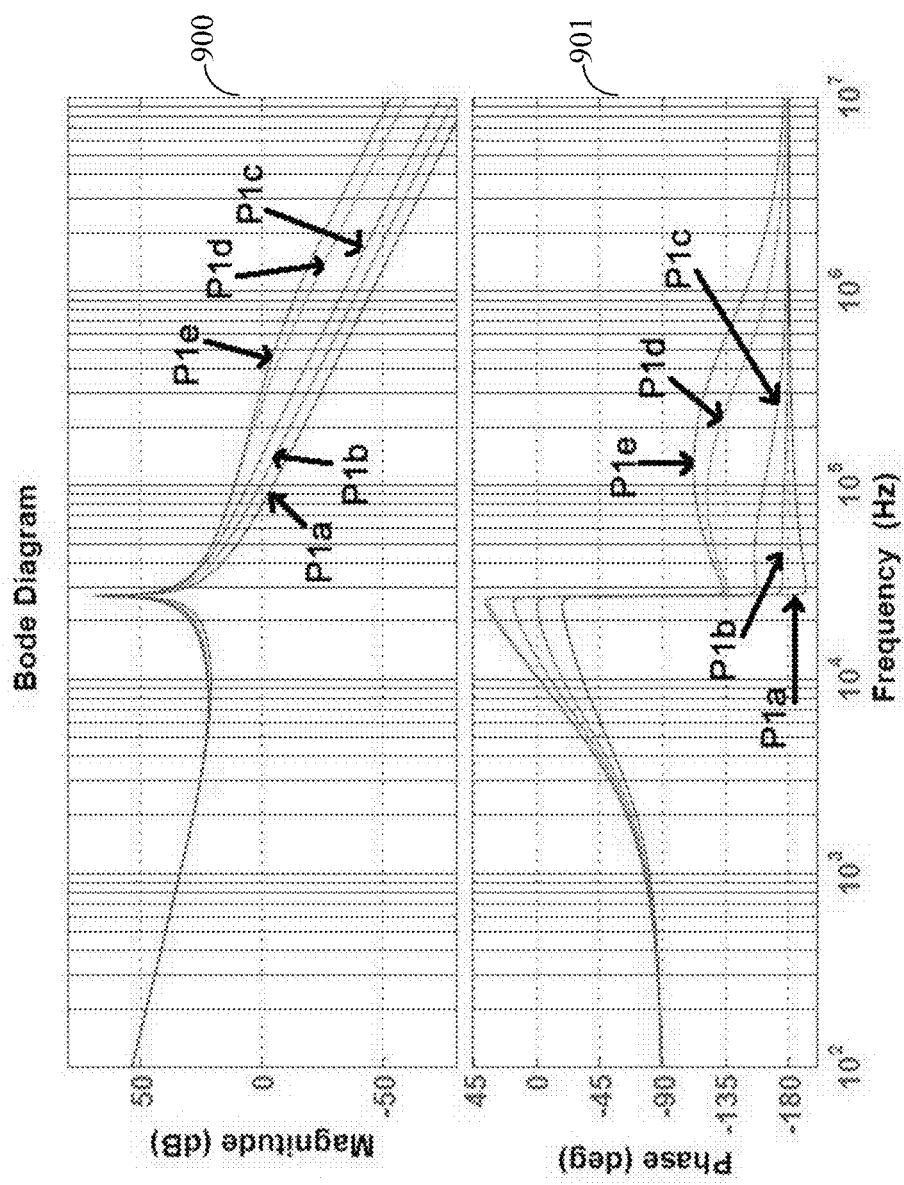
FIG. 9 is a graph depicting the magnitude in decibels (dB) and the phase of the signals of FIGS. 7 and 8.

FIG. 9 depicts graph 900 and 901, which are Bode diagrams of the magnitude and phase of those signals depicted in FIGS. 7 and 8. In this regard, graph 900 shows that by varying the poles P1a to P1e, the loop bandwidth is larger as the pole location is moved. In addition, graph 901 shows that as the pole locations are moved from P1a to P1e, the phase changes.

Figure 10:
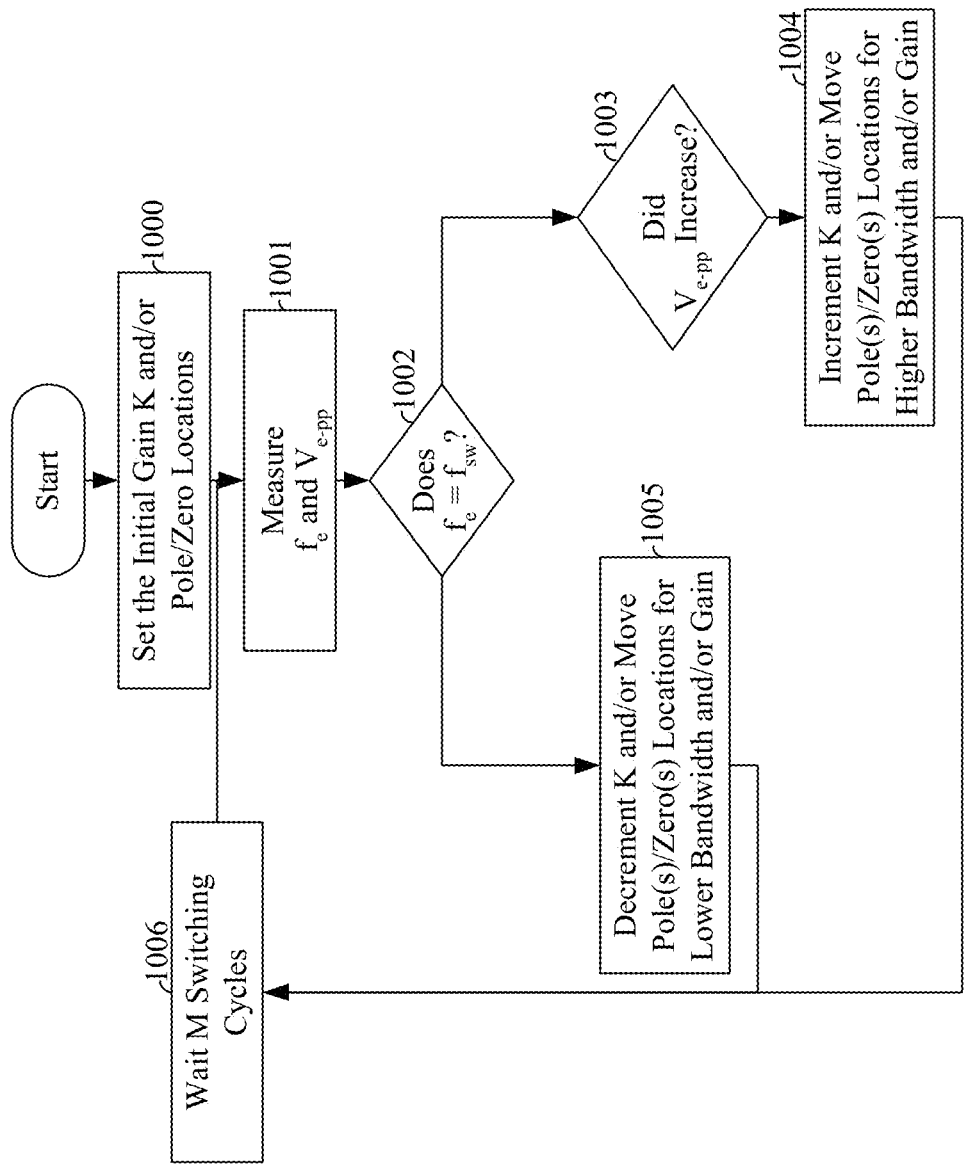
FIG. 10 is a flowchart depicting exemplary architecture and functionality of the power converter system of FIG. 5.

FIG. 10 depicts another exemplary operation of the FCLAT 506 (FIG. 5). In block 1000, the FCLAT logic 506 sets the initial gain K and/or a pole and/or a zero location of the closed look compensator 502. Such initial parameters may be set arbitrarily. In block 1001, the FCLAT logic 506 measures the frequency $f_e$ and the $V_{e\text{-}pp}$ of the error signal output from the closed-loop compensator 502.

If the frequency $f_e$ of the error signal $V_{e\text{-}conv}$ is equal to the frequency $f_{sw}$ of the power converter 501 within a specified range in block 1002, the FCLAT logic 506 determines if the $V_{e\text{-}pp}$ increased in block 1003. If the $V_{e\text{-}pp}$ increased in block 1003, the FCLAT logic 506 increments K and/or moves pole(s) and/or zero(s) location(s) to increase the bandwidth or the gain of the closed-loop compensator 502 in block 1004. If the frequency $f_e$ of the error signal $V_{e\text{-}conv}$ is not equal to the frequency $f_{sw}$ of the power converter 501 within the specified range in block 1002, the FCLAT logic 506 decrements K and/or moves pole(s) and/or zero(s) location(s) to lower the bandwidth and/or the gain of the closed-loop compensator 502, as indicated in block 1005. The FCLAT logic 506 then waits M switching cycles before taking another measurement of $f_e$ and $V_{e-pp}$, as indicated in block 1006.

Thus, with respect to the FCLAT 506 and in regard to the present disclosure, without the designer's knowledge of or the need to measure the power converter stage or system parameters and/or transfer function, the FCLAT 506 may use the closed loop compensator error signal information such as its peak-to-peak voltage, its frequency, and also its phase to adaptively auto-design, adaptively auto-tune, and/or adaptively reconfigure the design of a closed loop compensator. In addition, the FCLAT 506 can be implemented in software, firmware, hardware or any combination thereof, including analog and/or digital control circuitries. The FCLAT 506 can be also used by designers to design a closed loop compensator while observing the error signal behaviour only or along with other design criterion.

The FCLAT 506 can be also combined with some approximate knowledge of the power converter stage to perform its operation.

The FCLAT 506 can adjust the transfer function parameters of the closed loop such as gains, poles, and zeros and can also choose from several compensator designs and compensator types that are available. Based on the FCLAT 506, the compensator type or format can be adjusted.

Note that in the present disclosure, the FCLAT 506 is introduced by using a compensator type that regulates the output voltage, as an example and not limitation. However, the FCLAT 506 may also applied to other types of closed loop compensators and controllers including those that their objective is to sense and regulate current, power, and/or energy.

Note that the FCLAT 506 is introduced and discussed for power converter closed loop system. However, the FCLAT 506 is extendable and expandable to other types of closed loop systems or any other closed loop systems that involves the control of a variable or parameter in a closed loop manner.

Other variables can be also adjusted by the FCLAT other than the gain, poles and zeros. Example are adjusting the switching frequency value, delay time values, capacitor value, and/or inductor value while observing the error signal peak-to-peak value, frequency, and phase.

The FCLAT controller can use algorithms other than the ones shown in FIGS. 6 and 10 in order to utilize the error signal characterstics such as peak-to-peak values, frequency and phase and adjust the closed loop controller variables and other power converter system variables in order to improve the dynamic performance and improve stability.

The invention claimed is:

1. A power conversion system, comprising:
  a power converter configured to receive an input voltage, convert the input voltage to an output voltage, and provide the output voltage to a load;
  a closed loop compensator configured to receive the output voltage and a reference voltage, the closed loop compensator configured to transmit an error signal indicative of a difference between the output voltage and the reference voltage;
  a pulse width modulator configured to receive the error signal and modulate a control signal with the error signal to control the output voltage, the pulse width modulator configured to transmit the control signal to the power converter; and
  logic configured to receive the error signal and to measure a frequency of the error signal, the logic further configured to adjust a parameter of the closed loop compensator based on the measured frequency of the error signal, wherein the parameter is a gain of the closed loop compensator, wherein the power converter has a switching frequency, and wherein the logic is further configured to increase the gain of the closed loop compensator if the measured frequency of the error signal is within a specified range of the switching frequency.

2. The power conversion system of claim 1, wherein the logic is further configured to decrease the gain of the closed loop compensator if the measured frequency of the error signal is not within the specified range of the switching frequency.

3. The power conversion system of claim 1, wherein the logic is further configured to measure a peak-to-peak voltage of the error signal and adjust the parameter of the closed loop compensator based on the measured peak-to-peak voltage.

4. A power conversion system, comprising:
  a power converter configured to receive an input voltage, convert the input voltage to an output voltage, and provide the output voltage to a load;
  a closed loop compensator configured to receive the output voltage and a reference voltage, the closed loop compensator configured to transmit an error signal indicative of a difference between the output voltage and the reference voltage;
  a pulse width modulator configured to receive the error signal and modulate a control signal with the error signal to control the output voltage, the pulse width modulator configured to transmit the control signal to the power converter; and
  logic configured to receive the error signal and to measure a frequency of the error signal, the logic further configured to adjust a parameter of the closed loop compensator based on the measured frequency of the error signal, wherein the parameter is a pole or zero location of the closed loop compensator, wherein the power converter has a switching frequency, and wherein the logic is further configured to move a pole location of the closed loop compensator to lower a bandwidth of the closed loop compensator if the measured frequency of the error signal is within a specified range of the switching frequency.

5. A power conversion system, comprising:
  a power converter configured to receive an input voltage, convert the input voltage to an output voltage, and provide the output voltage to a load;
  a closed loop compensator configured to receive the output voltage and a reference voltage, the closed loop compensator configured to transmit an error signal indicative of a difference between the output voltage and the reference voltage;
  a pulse width modulator configured to receive the error signal and modulate a control signal with the error signal to control the output voltage, the pulse width modulator configured to transmit the control signal to the power converter; and
  logic configured to receive the error signal and to measure a frequency of the error signal, the logic further configured to adjust a parameter of the closed loop compensator based on the measured frequency of the error signal, wherein the parameter is a pole or zero location of the closed loop compensator, wherein the power converter has a switching frequency, and wherein the logic is further configured to move a zero location of the closed loop compensator to lower a bandwidth of the closed loop compensator if the measured frequency of the error signal is within a specified range of the switching frequency.

6. A power conversion system, comprising:
a power converter configured to receive an input voltage, convert the input voltage to an output voltage, and provide the output voltage to a load;
a closed loop compensator configured to receive the output voltage and a reference voltage, the closed loop compensator configured to transmit an error signal indicative of a difference between the output voltage and the reference voltage;
a pulse width modulator configured to receive the error signal and modulate a control signal with the error signal to control the output voltage, the pulse width modulator configured to transmit the control signal to the power converter; and
logic configured to receive the error signal and to measure a frequency of the error signal, the logic further configured to adjust a parameter of the closed loop compensator based on the measured frequency of the error signal, wherein the parameter is a pole or zero location of the closed loop compensator, wherein the power converter has a switching frequency, and wherein the logic is further configured to move pole and zero locations of the closed loop compensator to increase a bandwidth of the closed loop compensator if the measured frequency of the error signal is within a specified range of the switching frequency of the power converter and a peak-to-peak voltage of the error signal increases.

7. The power conversion system of claim 6, wherein the logic is further configured to move the pole and zero locations to decrease a bandwidth of the closed loop compensator if the measured frequency of the error signal is not within the specified range of the switching frequency.

8. A power conversion method, comprising:
receiving an input voltage via a power converter, wherein the power converter has a switching frequency;
converting the input voltage to an output voltage;
providing the output voltage to a load;
receiving the output voltage by a closed loop compensator;
receiving a reference voltage by the closed loop compensator;
transmitting an error signal by the closed loop compensator, the error signal indicating a difference between the output voltage and the reference voltage;
modulating a control signal with the error signal;
controlling the power converter based upon the control signal;
measuring a frequency of the error signal;
determining a frequency difference between the measured frequency of the error signal and the switching frequency; and
adjusting parameters of the closed loop compensator based upon the measured frequency of the error signal, wherein the adjusting comprises modifying a gain of the closed loop compensator based upon the frequency difference, and wherein the modifying comprises increasing the gain in the closed loop compensator if the frequency difference is within a specified range.

9. The power conversion method of claim 8, further comprising decreasing the gain in the closed loop compensator if the frequency difference is not within the specified range.

10. A power conversion method, comprising:
receiving an input voltage via a power converter, wherein the power converter has a switching frequency;
converting the input voltage to an output voltage;
providing the output voltage to a load;
receiving the output voltage by a closed loop compensator;
receiving a reference voltage by the closed loop compensator;
transmitting an error signal by the closed loop compensator, the error signal indicating a difference between the output voltage and the reference voltage;
modulating a control signal with the error signal;
controlling the power converter based upon the control signal;
measuring a frequency of the error signal;
determining a frequency difference between the measured frequency of the error signal and the switching frequency;
measuring a peak-to-peak voltage of the error signal; and
adjusting parameters of the closed loop compensator based upon the measured frequency of the error signal, wherein the adjusting comprises moving a pole location of the closed loop compensator to lower a bandwidth of the closed loop compensator if the frequency difference is within a specified range.

11. The power conversion method of claim 10, further comprising moving a zero location of the closed loop compensator to lower a bandwidth of the closed loop compensator if the frequency difference of the error signal is not within the specified range.

12. The power conversion method of claim 10, further comprising moving the pole location to increase the bandwidth of the closed loop compensator if the frequency difference of the error signal is not within the specified range and the peak-to-peak voltage of the error signal increases.

13. The power conversion method of claim 11, further comprising moving the zero location to increase the bandwidth of the closed loop compensator if the frequency difference of the error signal is not within the specified range and the peak-to-peak voltage of the error signal increases.

14. A power conversion method, comprising:
receiving an input voltage via a power converter, wherein the power converter has a switching frequency;
converting the input voltage to an output voltage;
providing the output voltage to a load;
receiving the output voltage by a closed loop compensator;
receiving a reference voltage by the closed loop compensator;
transmitting an error signal by the closed loop compensator, the error signal indicating a difference between the output voltage and the reference voltage;
modulating a control signal with the error signal;
controlling the power converter based upon the control signal;
measuring a frequency of the error signal;
determining a frequency difference between the measured frequency of the error signal and the switching frequency;
measuring a peak-to-peak voltage of the error signal; and
adjusting parameters of the closed loop compensator based upon the measured frequency of the error signal, wherein the adjusting comprises adjusting a parameter of the power converter to increase a bandwidth of the closed loop compensator if the frequency of the error signal is within a specified range of a switching frequency of the power converter and the peak-to-peak voltage of the error signal increases.

* * * * *